US006692713B2

(12) United States Patent
Grunwaldt et al.

(10) Patent No.: US 6,692,713 B2
(45) Date of Patent: Feb. 17, 2004

(54) PROCESS FOR THE CATALYTIC OXIDATION OF CARBONACEOUS COMPOUNDS

(75) Inventors: Jan-Dierk Grunwaldt, Zurich (CH); Herman Teuissen, Hillerod (DK)

(73) Assignee: Haldor Topsoe A/S, Lyngby (DK)

(*) Notice: Subject to any disclaimer, the term of this patent is extended or adjusted under 35 U.S.C. 154(b) by 252 days.

(21) Appl. No.: 10/010,792

(22) Filed: Nov. 13, 2001

(65) Prior Publication Data
US 2002/0098141 A1 Jul. 25, 2002

(30) Foreign Application Priority Data
Nov. 22, 2000 (DK) .................................. 2000 01755 U

(51) Int. Cl.$^7$ .............................................. C01B 31/20
(52) U.S. Cl. ............................ 423/245.1; 423/245.3; 423/247; 423/437.2; 423/656
(58) Field of Search ......................... 423/245.1, 245.3, 423/247, 437.2

(56) References Cited

U.S. PATENT DOCUMENTS

| | | | |
|---|---|---|---|
| 3,216,783 A | 11/1965 | Cohn | |
| 3,666,412 A | 5/1972 | Sowards | |
| 4,698,324 A | 10/1987 | Haruta et al. | |
| 5,550,093 A | 8/1996 | Wan et al. | |
| 5,662,873 A | 9/1997 | Gary | |
| 5,693,302 A | 12/1997 | Gary | |
| 5,702,838 A | 12/1997 | Yasumoto et al. | |
| 5,789,337 A | 8/1998 | Haruta et al. | |
| 5,895,772 A | 4/1999 | Grigorova et al. | |
| 5,955,395 A | 9/1999 | Andorf et al. | |
| 5,993,762 A | * 11/1999 | Rajaram et al. | 423/247 |
| 5,997,835 A | 12/1999 | Hyldtoft et al. | |
| 6,475,454 B1 | * 11/2002 | Cole et al. | 423/247 |
| 6,548,034 B2 | * 4/2003 | Takamura et al. | 423/247 |
| 6,555,088 B1 | * 4/2003 | Baumann et al. | 423/437.2 |
| 6,576,208 B1 | * 6/2003 | Itoh et al. | 423/247 |

FOREIGN PATENT DOCUMENTS

| | | |
|---|---|---|
| EP | 0 884 274 A1 | 12/1998 |
| EP | 0 968 958 A1 | 1/2000 |
| JP | 2290251 A | 11/1990 |
| JP | 295502 * | 11/1996 |

OTHER PUBLICATIONS

M. Haruta, et al. "Low-temperature Catalytic Combustion of Methanol and Its Decomposed Derivatives Over Supported Gold Catalysts", *Catalysts Today*, Amsterdam, NL, vol. 29, 1996, pp. 443–447, (No month).

M. Haruta, "Gold As a Low-Temperature Oxidation Catalyst: Factors Controlling Activity and Selectivity", *1997 Elsevier Science*, pp. 123–135, (No month).

Se H. Oh and Robert M. Sinkevitch, Carbon Monoxide Removal From Hydrogen–Rich Fuel Cell Feedstreams by Selective Catalytic Oxidation, *Journal of Catalysis 142*, pp. 254–262, (1993). (No month).

Hiroaki Sakura, et al. Low–temperature Water–gas Shift Reaction Over Gold Deposited on $TiO_2$, Chem Community, (1997), p. 271. (No month).

Vinay Kumar Singh et al., "Low Temperature Synthesis of Spinel ($MgAl_2O_4$)", Materials Letters 31, pp. 281–285 (1997), (No month).

Christian Marcilly, et al., "Preparation of Highly Dispersed Mixed Oxides and Oxide Solid Solutions by Phrolysis of Amorphous Organic Precursors", *Journal of the American Ceramic Society*, vol. 53, No. 1, (Jan. 1970).

Masatake Haruta, "Size–and Support–dependency in the Catalysis of Gold", *Catalyst Today 36*, pp. 153–166 (1997), (No month).

Rosa M. Torres Sanchez, "Selective Oxidation of CO in Hydrogen Over Gold Supported on Manganese Oxides", *Journal of Catalysis 168*, pp. 125–127 (1997). (No month).

M. J. Kahlich et al., "Kinetics of Selective Low–Temperature Oxidation of CO in $H_2$–Rich Gas Over Au/α–$Fe_2O_3$". *Journal of Catalysts 182*, pp. 430–440 (1999), (No month0.

J. Salomones et al., Synthesis and Characterization of Nanocrystallite $MgAl_2O_4$, Spinels as Catalysts Support, *Journal of Materials Science Letters 19*, pp. 1033–1037, (2000). (No month).

Jan–Dierk Grunwaldt et al., Comparative Study $Au/TiO_2$ and $Au/ZrO_2$ Catalysts for Low–Temperature CO Oxidation, *Journal of Catalysis 186*, pp. 458–469, (1999). (No month).

Jan–Dierk Grunwaldt, "Preparation of Supported Gold Catalysts for Low–Temperature CO Oxidation via "Size–Controlled" Gold Colloids", *Journal of Catalysis 181*, pp. 223–232, (1999), (No month).

Donka Andreeva et al., "Au/α–Fe2O3 Catalyst for Water–Gas Shift Reaction Prepared by Deposition–precipitation", *Applied Catalysts A: General 169*, pp. 9–14, (1998), (No month).

J. I. DiCosimo, et al., "Structure and Surface and Catalytic Properties of Mg–Al Basic Oxides", *Journal of Catalysis 178*, pp. 499–510, (1988). (No month).

* cited by examiner

*Primary Examiner*—Wayne A. Langel
(74) *Attorney, Agent, or Firm*—Dickstein, Shapiro, Morin & Oshinsky, LLP

(57) ABSTRACT

Process for the preferential oxidation of carbon monoxide and/or $CH_3OH$ in a hydrogen containing process stream by contacting the process stream with a catalyst comprising gold on a support comprising non-reducible magnesium aluminium oxide in form of $MgAl_2O_4$ spinel.

4 Claims, No Drawings

PROCESS FOR THE CATALYTIC OXIDATION OF CARBONACEOUS COMPOUNDS

BACKGROUND OF THE INVENTION

The present invention is directed in general to a catalytic oxidation process of a carbonaceous feed stock and to a catalyst being useful in the process. In particular, the invention relates to preferential oxidation of carbon monoxide and other carbonaceous compounds in hydrogen containing feed stocks in presence of a catalyst comprising gold as the active catalytic component supported on a support comprising magnesium aluminum oxide.

Carbon monoxide and lower hydrocarbons, being present in a large number of industrial processes, are usually unwanted in the products from those processes. A number of processes for the removal of these compounds are known in the art. Thus, U.S. Pat. No. 5,662,873 and U.S. Pat. No. 5,693,302 disclose a process for the removal of CO mainly from inert gases using a gold/palladium, gold, and gold/silver or gold/platinum metal catalyst supported on titanium dioxide. By the above known processes also certain amounts of hydrogen are lost by oxidation.

When producing hydrogen, e.g. by steam reforming, it is necessary in a number of processes to remove residual amounts of CO from the product gas selectively without oxidation of hydrogen. One process to selectively remove CO is preferential oxidation, whereby CO is oxidized with oxygen to carbon dioxide. In the preferential oxidation process it is desirable that preference for CO oxidation is substantially higher than hydrogen oxidation to avoid loss of valuable hydrogen.

U.S. Pat. No. 5,955,395 discloses use of Pt/zeolite catalysts and U.S. Pat. No. 3,216,783 relates to Pt/Al$_2$O$_3$ catalysts for use in the abatement of CO. Oh and Sinkevick (S. H. Oh and R. M. Sinkewitch, J. Catal. 142, 254 (1993)) mention use of Ru/Al$_2$O$_3$ and Rh/Al$_2$O$_3$ catalysts for use in the selective CO removal, while U.S. Pat. No. 5,702,838 uses a catalyst comprising an A-type zeolite and at least one metal selected from the group consisting of Pt, Pd, Ru, Au, Rh and Ir, or an alloy of two or more metals. A limited number of catalyst systems based on gold on reducible metal oxide supports have been investigated for the oxidation of CO in the presence of H$_2$: Au/MnOx (R. M. Torres-Sanchez, A. Ueda, K. Tanaka, M. Haruta, J. Catal. 168, 125–127 (1997)) and Au/Fe$_2$O$_3$ (M. J. Kahlich, H. A. Gasteiger, R. J. Behm, J. Catal. 182, 430–440 (1999)). The term "reducible" oxides is used in literature for those catalysts containing a transition metal ion that can occur in at least two different oxidation states (cf. M. Haruta, Gold as low temperature oxidation catalyst: factors controlling activity and selectivity, 3rd World Congress on Oxidation Catalysis, R. K. Grasselli, S. T. Oyama, A. M. Gaffney, J. E. Lyons, San Diego, Elsevier Science B. V., pages 123–134 (1997)) and it is distinguished between non-reducible and reducible oxides in the following according to this definition.

Generally, the use of gold catalysts for oxidation of CO by air or oxygen containing atmosphere is known in the art. Haruta et al. describe preparation of gold catalysts in U.S. Pat. No. 4,698,324 and the preparation of gold on reducible metal oxides by co-precipitation. The gold loading was very high (about 10% by weight) in U.S. Pat. No. 4,698,324 and improved methods were reported in e.g. U.S. Pat. No. 5,789,337. U.S. Pat. No. 5,550,093 mentions use of zeolites as hosts for gold, preferentially in combination with transition metal oxides. Preparation of small gold particles and deposition of gold colloids have been described in the open literature (J.-D. Grunwaldt, M. Maciejewski, O. S. Becker, P. Fabrizioli, A. Baiker, J. Catal. 186, 458 (1999)). However, strong dependence of the Co oxidation activity on the nature of the support material has been found and described in literature (M. Haruta, Catal. Today 36, 153(1997), J.-D. Grunwaldt, M. Maciejewski, O. S. Becker, P. Fabrizioli, A. Baiker, J. Catal. 186, 458 (1999)). Also the poisonous character of water on some Au/metal oxide catalysts has been mentioned (M. A. Bollinger, M. A. Vannice, Appl. Catal. B Environm. 8, 417 (1996), J.-D. Grunwaldt, C. Kiener, C. Woegerbauer, A. Baiker, J. Catal. 181, 223 (1999)). Usually, use of reducible oxides is preferred to achieve more active gold catalysts. Additionally, combinations of gold and Al$_2$O$_3$ and gold and MgO/Mg(OH)$_2$ are known in the art. It is further known that the Au cluster size has to be about 1 nm on Be(OH)$_2$ and Mg(OH)$_2$ (M. Haruta, Gold as low temperature oxidation catalyst: factors controlling activity and selectivity, 3rd World Congress on Oxidation Catalysis, R. K. Grasselli, S. T. Oyama, A. M. Gaffney, J. E. Lyons, San Diego, Elsevier Science B. V., pages 123–134 (1997)).

Oxidation of CO and hydrocarbons by gold as noble metal on cobalt oxide (Co$_3$O$_4$) or ferric oxide (Fe$_3$O$_4$) as transition metal is mentioned in U.S. Pat. No. 5,895,772.

Several further oxidation reactions of carbonaceous compounds (i.e. alcohols, alkenes, alkines) as well as hydrogenation and water gas shift reactions are catalyzed by gold (M. Haruta Catalysis Today 36, 163 (1997), H. Sakurai, A. Ueda, K. Atsushi, M. Haruta, Chem. Commun., Issue 3, 271 (1997); D. Andreeva, T. Tabakova, V. Idakiev, P. Christov, R. Giovanoli, Appl. Catal. A: General 169, 9 (1998)).

However, in the above mentioned state of art it is nowhere disclosed to use gold on a simple non-reducible support of metal oxides as a catalyst for preferential oxidation of carbonaceous compounds in the presence of hydrogen.

It has now been found that gold on the non-reducible MgAl$_2$O$_4$ spinel support provides in general an improved catalyst for the above mentioned gold catalyzed processes, particularly in the oxidative removal of carbon monoxide. The catalyst has high stability in the presence of water and CO$_2$ and shows selectivity towards the oxidation of carbon monoxide in presence of hydrogen.

Preparation and use of MgAl$_2$O$_4$ as support in different processes is known in the art, cf. J. Am. Cer. Soc., Discussion and Notes, Vol. 53(1), 56 (1970), J. Mater. Sci. Lett. 19, (2000) 1033; Mater. Lett. 31 (1997) 281, U.S. Pat. No. 5,997,835.

SUMMARY OF THE INVENTION

In accordance with the above findings and observations, this invention is a process for the oxidation of carbonaceous compounds by contacting the compounds with a catalyst comprising gold on a non-reducible support of MgAl$_2$O$_4$. MgAl$_2$O$_4$ is stable in an environment with hydrogen, carbon monoxide, carbon dioxide, methanol and water. Thus, the invention is in particular useful in the oxidation of carbon monoxide and of carbon monoxide in presence of hydrogen, water and carbon dioxide.

The catalyst according to the invention is additionally useful in selective oxidation of CO for gas purification purposes, oxidation of other carbonaceous compounds and water gas shift reaction.

The catalytic activity during oxidation of CO in case of the Au-MgAl$_2$O$_4$ system is maintained or even improved in the presence of water and/or CO$_2$, and the catalyst material is selective towards CO oxidation in the presence of H$_2$. Best results are obtained on the magnesium aluminum oxide catalysts, when the gold particles are smaller than 10 nm and in most cases calcinations between 200 and 600° C. have been found to be advantageous. Both powder and preshaped carriers can be used.

DETAILED DESCRIPTION OF SPECIFIC EMBODIMENTS

Preparation of Gold Catalysts on Magnesium Aluminum Oxide

In the preparation of gold based $MgAl_2O_4$ catalysts:
(a) porous ceramic carrier material containing $MgAl_2O_4$ is used (in the following only referred to as $MgAl_2O_4$); and
(b) a method for applying small gold particles on the ceramic carrier is employed.

This can be i.e. achieved by
(a) deposition of gold colloids on the support;
(b) homogeneous deposition precipitation of a Au(III) precursor, for instance $Au(NH_3)_4(NO_3)_3$; and
(c) chemical vapour deposition of a volatile Au(III) compound, for instance $(CH_3)_2Au(CH_3COCHCOCH_3)$.

These and further methods for producing small gold particles are state of the art and described in the literature.

The carrier material $MgAl_2O_4$ is described in literature (J. Am. Cer. Soc., Discussion and Notes, 53(1), 56 (1970), J. Mater. Sci. Lett. 19, (2000) 1033; Mater. Lett. 31 (1997) 281) and an excess of Al is preferred. The specific surface area is preferentially high.

Several examples are given to illustrate the invention in further detail, but without restricting its preparation by other techniques aiming at the production of small gold particles on an $MgAl_2O_4$ support.

EXAMPLE 1.1

Preparation of a $MgAl_2O_4$ supported Au catalyst using the colloid method.

First, a solution is prepared of 98 mg $HAuCl_4.3H_2O$ in 5.5 mL water (solution A). Then, a solution is prepared of water (210 mL), and 4.55 mL of an aqueous solution containing tetrakis (hydroxymethyl) phosphonium chloride (THPC: $(CH_2OH)_4PCl$), altogether giving solution B. The THPC solution is obtained by diluting 1.2 mL of the commercial 80% THPC solution to 100 mL. The pH of solution B is adjusted to 10.0, regulating the addition of a 0.2 M NaOH solution. Solution A is added dropwise to solution B, while keeping the pH constant at 10. The solution turns black and is stirred for 10 min. at room temperature. Then, the pH of the colloid is adjusted to 2.0 by addition of dilute $H_2SO_4$. Separately, 10 g $MgAl_2O_4$ (crushed to particles <106 µm) is suspended in 200 mL dilute $H_2SO_4$ with a pH of 2.0. The latter suspension is treated with ultrasonic irradiation for 15 min. Then, the colloid is added to the $MgAl_2O_4$ suspension followed by 10 min. stirring at room temperature. The final suspension is filtered, washed with water and dried at 110° C. Transmission electron microscopy and EXAFS showed that the particle size of gold was mainly around 20–50 Å.

EXAMPLE 1.2

Preparation of a $MgAl_2O_4$ supported Au catalyst using deposition precipitation.

A solution is prepared containing 171.9 mg $Au(NH_3)_4(NO_3)_3$ and 51.7 mg urea in 375 mL water. Then, 10 g $MgAl_2O_4$ (crushed to particles <350 µm) is added and the suspension is heated to 90° C. for 20 h. Subsequently, the reaction mixture is filtered, washed with water and dried at 110° C. The product is calcined for 1 h at 300° C.

EXAMPLE 1.3

Preparation of a $MgAl_2O_4$ supported Au catalyst using deposition precipitation and a preshaped carrier.

A solution is prepared containing 171.9 mg $Au(NH_3)_4(NO_3)_3$ and 51.7 mg urea in 375 mL water. Then, 10 g $MgAl_2O_4$ shaped as cylinders (diameter 4 mm; height 4 mm) is added and the suspension is heated to 90° C. for 20 h. Subsequently, the reaction mixture is filtered, washed with water and dried at 110° C. The product is calcined for 1 h at 300° C.

EXAMPLE 1.4

Preparation of a $MgAl_2O_4$ supported Au catalyst using the colloid method and a preshaped carrier.

First, an Au colloid is prepared as described in Example 1. The adsorption of the colloid was achieved according to Example 1.1 using 10 g $MgAl_2O_4$ shaped as cylinders (diameter 4 mm; height 4 mm) at pH 2.0.

EXAMPLE 1.5

Preparation of a $MgAl_2O_4$ supported Au catalyst using volatile $(CH_3)_2Au(CH_3COCHCOCH_3)$. 0.016 g of the organic precursor (equivalent to 0.01 g of gold) has been evaporated in vacuum and adsorbed on the support (1.0 g). The material was heated to 200° C. to decompose the precursor.

Catalytic Activity during CO-Oxidation

The gold catalysts according to the invention have proved high activity for oxidizing CO at low temperatures, optionally in the presence of water, $CO_2$ and $H_2$. The CO may be present in the gas mixture in a relatively low concentration, for instance 10 to 100 ppm or high concentrations, up to 10% by volume or more. The catalyst is therefore not only applicable for CO oxidation in inert gases, but also i.e. for selective CO removal in reformate gases or other gases containing CO, hydrogen, $CO_2$, and/or water.

The oxygen content is preferentially slightly higher than the content of CO.

Several examples are given to illustrate the unique catalytic properties, but without restricting its scope. As examples two different feed gases with 0.5% CO/0.5% $O_2$/5% $H_2$/balance Ar (gas A), and 1.8% $O_2$/1.0% CO/21% $CO_2$/balance $H_2$ (gas B) were used and the influence of water is shown by addition of 3 vol % water. The comparison to $Au/Al_2O_3$ catalysts and $Au/Mg(OH)_2$ catalysts prepared by methods according to the state of the art showed that they were less active and $Au/Mg(OH)_2$ deactivated in the presence of $CO_2$.

EXAMPLE 2.1

A catalyst prepared according to Example 1.1 gave catalytic results in an integral plug flow reactor as shown in the following Table 1.

TABLE 1

| Temperature/ ° C. | Feed gas[1] | $H_2$ conversion in %[2] | CO conversion in %[3] | Flow $(l \cdot h^{-1}g_{cat}^{-1})$ |
|---|---|---|---|---|
| 50 | A | 1.8 | 18 | 90 |
| 75 | A | 2.4 | 33 | 90 |
| 100 | A | 3.6 | 49 | 90 |
| 75 | A + 3%$H_2O$ | 2.4 | 60 | 90 |
| 75 | B | 0.51 | 19 | 90 |

TABLE 1-continued

| Temperature/ °C. | Feed gas[1] | $H_2$ conversion in %[2] | CO conversion in %[3] | Flow $(l \cdot h^{-1}g_{cat}^{-1})$ |
|---|---|---|---|---|
| 100 | B | 0.58 | 42 | 90 |
| 150 | B | 0.97 | 59 | 90 |

[1]Gas A: 0.5%CO/0.5%$O_2$/5%$H_2$/Ar, Gas B: 1.8%$O_2$/1.0%CO/21%$CO_2$/balance $H_2$.
[2]Conversion is based on total amount of $H_2$ in gas A (5 vol %) and gas B (76.2 vol %).
[3]Conversion is based on total amount of CO in gas A (0.5 vol %) and gas B (1.0 vol %).

The catalyst was used in form of a sieved fraction (0.3–0.7 mm). The gold content was 0.79 wt %, as determined by chemical analysis. The main particle size was 20–50 Å, as determined by transmission electron microscopy (TEM) and the determination of the coordination number in extended X-ray absorption spectroscopy (EXAFS).

EXAMPLE 2.2

A catalyst prepared according to Example 1.2 and containing 0.42% Au according to chemical analysis gave the following results (Table 2).

TABLE 2

| Temperature/ °C. | Feed gas[1] | $H_2$ conversion in %[2] | CO conversion in %[3] | Flow $(l \cdot h^{-1}g_{cat}^{-1})$ |
|---|---|---|---|---|
| 50  | A | <1.0% | 86 | 60 |
| 75  | A | 3.2 | 89 | 60 |
| 100 | A | 6.6 | 98 | 60 |
| 100 | A | 4.6 | 83 | 90 |
| 100 | A + 3%$H_2O$ | 3.0 | 84 | 90 |
| 100 | B | 3.2 | 79 | 90 |
| 75  | B | 0.1 | 49 | 90 |
| 50  | B | <0.1 | 22 | 90 |

[1]Gas A: 0.5%CO/0.5%$O_2$/5%$H_2$/Ar, Gas B: 1.8%$O_2$/1.0%CO/21%$CO_2$/balance $H_2$.
[2]Conversion is based on total amount of $H_2$ in gas A (5 vol %) and gas B (76.2 vol %).
[3]Conversion is based on total amount of CO in gas A (0.5 vol %) and gas B (1.0 vol %).

The following Table 3 gives an example for a test of the catalyst at 100° C. under the same conditions during a longer time (time=0, when started with gas feed 1.7% $O_2$/1.0% CO/20.4% $CO_2$/3% $H_2O$/balance $H_2$).

TABLE 3

| Time/h | Feed gas | $H_2$ conversion in %[2] | CO conversion in %[3] | Flow $(l \cdot h^{-1}g_{cat}^{-1})$ |
|---|---|---|---|---|
| 0  | B + 3%$H_2O$ | 3.1 | 79 | 90 |
| 90 | B + 3%$H_2O$ | 3.2 | 81 | 90 |

EXAMPLE 2.3

A catalyst prepared according to Example 1.5 gave the following performance (Table 4). The nominal loading of gold was 0.1% by weight.

TABLE 4

| Temperature/ °C. | Feed gas[1] | $H_2$ conversion in %[2] | CO conversion in %[3] | Flow $(l \cdot h^{-1}g_{cat}^{-1})$ |
|---|---|---|---|---|
| 75  | A | <1% | 38 | 60 |
| 100 | A | 3.0 | 53 | 60 |
| 150 | A | 4.8 | 73 | 60 |
| 50  | B | 0.34 | 14 | 60 |
| 75  | B | 0.53 | 39 | 60 |
| 100 | B | 1.3 | 69 | 60 |

[1]Gas A: 0.5%CO/0.5%$O_2$/5%$H_2$/Ar, Gas B: 1.8%$O_2$/1.0%CO/21%$CO_2$/balance $H_2$.
[2]Conversion is based on total amount of $H_2$ in gas A (5 vol %) and gas B (76.2 vol %).
[3]Conversion is based on total amount of CO in gas A (0.5 vol %) and gas B (1.0 vol %).

EXAMPLE 2.4

The performance of a catalyst on a preshaped carrier (Example 1.3) is shown in the following Table 5. The loading of the catalyst was 0.10% by weight as determined by chemical analysis.

TABLE 5

| Temperature/ °C. | Feed gas[1] | $H_2$ conversion in %[2] | CO conversion in %[3] | Flow $(l \cdot h^{-1}g_{cat}^{-1})$ |
|---|---|---|---|---|
| 50  | A | 1.0 | 37 | 18 |
| 75  | A | 1.8 | 62 | 18 |
| 100 | A | 4.2 | 84 | 18 |
| 50  | A + 3%$H_2O$ | 0.2 | 67 | 18 |
| 75  | A + 3%$H_2O$ | 0.8 | 85 | 18 |
| 50  | B | 0.1 | 28 | 18 |
| 75  | B | 2.0 | >99 | 18 |

[1]Gas A: 0.5%CO/0.5%$O_2$/5%$H_2$/Ar, Gas B: 1.8%$O_2$/1.0%CO/21%$CO_2$/balance $H_2$.
[2]Conversion is based on total amount of $H_2$ in gas A (5 vol %) and gas B (76.2 vol %).
[3]Conversion is based on total amount of CO in gas A (0.5 vol %) and gas B (1.0 vol %).

What is claimed is:

1. Process for the preferential oxidation of carbon monoxide and/or $CH_3OH$ in a hydrogen containing process stream by contacting the process stream with a catalyst comprising gold on a support comprising non-reducible magnesium aluminium oxide in form of $MgAl_2O_4$ spinel.

2. Process according to claim 1, wherein concentration of gold on the support is in the range of 0.01 to 10 percent by mass of the catalyst.

3. Process according to claim 1, wherein the support is in the form of powder, monolith, extrudate, rings, pellets, plates and/or pearls.

4. Process according to claim 1, wherein the process stream comprises additionally $O_2$ and/or $H_2O$ and/or $CO_2$.

* * * * *